Dec. 17, 1968 I. W. WOLF 3,417,385

THIN FILM SHIFT REGISTER

Filed Aug. 4, 1964 3 Sheets-Sheet 1

IRVING W. WOLF
INVENTOR.

BY Stuart Lubitz
ATTORNEY

Dec. 17, 1968 I. W. WOLF 3,417,385

THIN FILM SHIFT REGISTER

Filed Aug. 4, 1964 3 Sheets-Sheet 2

IRVING W. WOLF
INVENTOR

BY Stuart Lubitz
ATTORNEY

Dec. 17, 1968 I. W. WOLF 3,417,385

THIN FILM SHIFT REGISTER

Filed Aug. 4, 1964 3 Sheets-Sheet 3

IRVING W. WOLF
INVENTOR

BY Stuart Lubitz
ATTORNEY

United States Patent Office 3,417,385
Patented Dec. 17, 1968

3,417,385
THIN FILM SHIFT REGISTER

Irving William Wolf, Palo Alto, Calif., assignor to Ampex Corporation, Redwood City, Calif., a corporation of California Filed Aug. 4, 1964, Ser. No. 387,427
10 Claims. (Cl. 340—174)

ABSTRACT OF THE DISCLOSURE

Thin magnetic film memory with a checkerboard or multi-level array of magnetic sites which are magnetically coupled to one another within a common plane and having a shifting or propagating coil coupled to each level of sites. The geometrical arrangement of the multi-level array of sites enables one site to nucleate an adjacent site utilizing relatively low values of magnetic propagation fields in the propagating coils.

This invention relates to a memory device and more particularly to a thin magnetic film memory wherein the transfer of information is facilitated by a novel geometry and phenomenon.

Within the past ten years there has been a large interest in thin magnetic film memories. This interest has been generated by a desire to reduce the cost of completely wired core memories and to improve the performance of such widely used arrangements. Core memories also appear to be approaching their technical limit as to speed of operation so that there is a need for a new elemental arrangement which does not have such a limit or has a higher limit. In addition, core arrays are exceedingly difficult to manufacture. These arrays require the most careful threading operations. The fabrication cost associated with this threading operation has regularly decreased, but the cost improvement now seems to have leveled off. A common wired core may now cost anywhere from a cent to five cents.

Thin magnetic film memories are one approach to overcoming the above shortcomings. There are generally two classes of thin film memory devices. Those that rely primarily upon rotational magnetic switching and those that rely mainly upon domain wall motion. Many of the former class of devices are made from discrete thin film elements while the latter class of thin film devices are primarily continuous film arrangements. The discrete element device is exemplified by U.S. Patent 3,113,297 issued to W. Dietrich on Dec. 3, 1963 while the continuous film device is shown in U.S. Patents 2,984,825 issued to H. W. Fuller, et al. on May 16, 1961, 3,092,813 issued to K. D. Broadbent on June 14, 1963, and 2,919,432 issued to K. D. Broadbent on Dec. 29, 1959. The longer list of patents pertaining to continuous film devices is included because it is that type of device that this invention is primarily concerned with.

The above cited patents and other prior art publication recognize that the creation of a reverse domain requires a greater magnetic field than the propagation of a domain. The switching of a magnetic domain by the rotational process is a substantially different technique. In the prior art patents domain growth or wall movement takes place along a substantially continuous longitudinal member. The control of the movement of the domains (propagation) and the creation of domains in a continuous member has been a major problem in prior art devices. For example, U.S. Patent 3,092,813 issued to K. D. Broadbent (Columns 2–4) sets forth the problem and attempts to solve it by employing a longitudinal member with a magnetically hard border and a magnetically soft central information channel. This arrangement may minimize the existence of spurious domains and enable the use of a greater margin between the propagating field and the creating field. The Broadbent patent does not, however, provide a means for conveniently and precisely controlling the domain configuration and the domain wall motion along the continuous film. In addition, the domain walls which are irregularly shaped require an excess area to insure that the particular domain is contained within a given location. This tends to limit packing densities.

Another approach to controlling wall motion is shown in the U.S. Patent 2,984,825 issued to H. W. Fuller, et al. on May 16, 1961. The technique disclosed therein uses a storage thin film and a scanning thin film. The Bloch wall of the scanning film switches the domains in the storage thin film while the variation of the velocity of the Bloch wall across the scanning thin film may function as a readout means. The control of the velocity of the Bloch wall in the scanning film presents a substantial problem (see Column 8 of the patent).

U.S. Patent 3,113,297 issued to W. Dietrich on Dec. 3, 1963 is a typical teaching of the use of the magnetic rotational process in a thin film memory. This patent discloses a control film element and a controlled film element. The field of the control element is coupled to the controlled element so that when the controlled element is magnetized in an easy direction and has a magnetic field applied to it and removed, the return orientation in the easy direction is determined by the direction of magnetization of the control element. (It is understood that there are at least two opposed easy directions.) The steps of magnetizing the controlled element followed by the return to an easy direction are time consuming and power consuming steps. These steps require considerable logic circuitry when the device is to be used in a shift register or a linear select memory.

The invented thin film memory solves the above discussed problems of wall motion control by providing a thin film geometry which limits and controls the travel of a domain and enables one site or domain to influence the adjacent site or domain. The influence of one site upon an adjacent site will reinforce the adjacent site's magnetization if in the same direction. The existence of an oppositely magnetized adjacent domain will cause a reverse nucleation or more particularly enable the formation of minute oppositely orientated domains in the adjacent site. This nucleation transfer from the adjacent site will enable the magnetization of the reverse nucleated site to be switched by wall motion and by a relatively low value magnetic propagating field. Without the reverse nucleate present, the magnetic field necessary to cause switching is much larger and the application of a propagating field would have no or little effect on the site. This principle will hereinafter be referred to as the nucleate transfer process.

The invented thin film memory also enables low manufacturing costs and high speeds of operation. The low cost is attributable to the simplicity of the geometry which enables simple wiring and mass automatic production by vacuum deposition or electrodeposition techniques. The speed of operation is limited only by the domain wall velocity.

Briefly, the structure of the invention comprises a checkerboard or multi-level array of magnetic sites which are magnetically coupled to one another and one shifting or propagating coil coupled to each level or checkerboard line. As shown in the drawings the term multi-level is meant to define at least two levels or rows of magnetic sites which are alternately staggered about a centrally extending line within a single plane, to thus define a zig-zag magnetic site array. The adjacent sites of the zig-zag array are disposed such that their edges overlap a selected distance within the single plane. This geometrical arrangement facilitates the winding of the array, controls the wall domain motion accurately and enables one site to nucleate the adjacent site. The details of this construction will be readily understood when the detailed description is read in conjunction with the drawings wherein:

Figure 1:
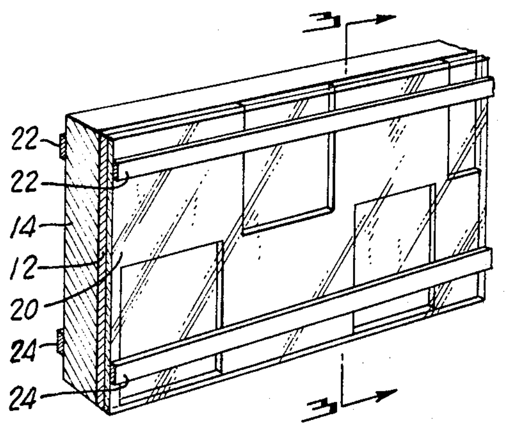
FIGURE 1 is a perspective view of a first embodiment of a thin film magnetic array utilizing the invention.
Figure 2:
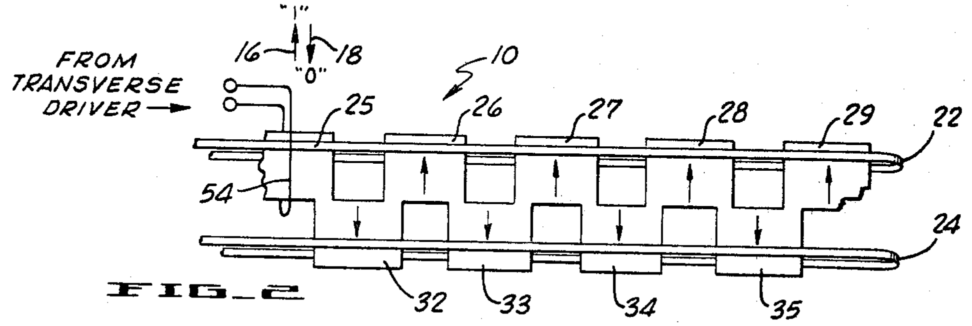
FIGURE 2 is a front view of the embodiment of FIGURE 1.
Figure 3:
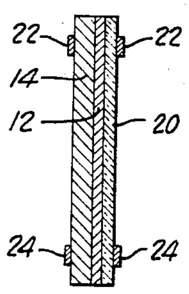
FIGURE 3 is a sectional view taken along line 3—3 of FIGURE 1.

FIGURES 1–3 show one embodiment of the invented thin film magnetic memory device. Thin film memory means 10 comprises a thin magnetic film 12 which is deposited on a substrate 14. Thin magnetic film 12 may typically be a ferromagnetic material such as Fe, Ni, Co, Mn, Bi or alloys thereof which have been correctly treated to obtain an easy direction of magnetization. When an easy direction of magnetization is obtained, the electron spins are substantially aligned parallel to an axis of preferred alignment and are capable of being magnetized to saturation along said easy direction to form a single magnetic domain. The alignment along said axis of said preferred alignment may take place in a first preferred direction or in a second preferred direction which directions in the case of the embodiment shown by FIGURE 2 are designated by arrows 16 and 18. For the purposes of this description arrow 16 in a binary memory is designated as the "one" direction and arrow 18 shall be designated as the "zero" direction.

Substrate 14 forms a rigid base for supporting magnetic thin film 12. This means for supporting 14 may be made from a material such as glass. An insulation film 20 made from a material such as SiO is deposited over thin film 12. The film 20 by appropriate masking techniques may take on any desired configuration that is suitable for electrically insulating a pair of conductors or coil 22 and 24 from thin magnetic film 12. Coils 22 and 24 which may be made from copper or aluminum form part of an energization means or magnetic field means for applying a given magnetic field to thin magnetic film 12. More particularly, coil 22 is positioned in the proximity or around a first level of thin film elements or sites 25–29 while coil 24 is positioned in the proximity or around a second level of thin film elements or sites 32–35.

Figure 4:
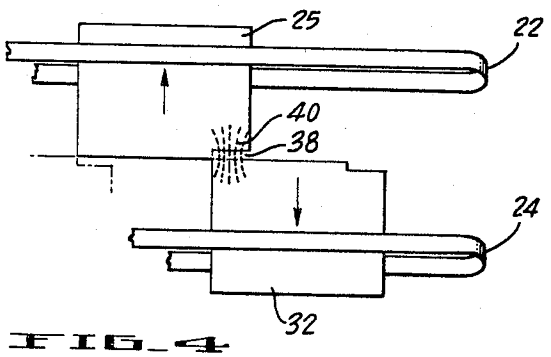
FIGURE 4 is another embodiment of a thin film magnetic array utilizing the invention.

As shown in FIGURE 1, the two levels of magnetic sites are arranged in a checkerboard configuration with the corners of adjacent elements connected through a small area. The sites 32–35 are adjacent the first level of magnetic sites 25–29 and at a second or lower level. The degree of adjacent site overlap and thus the area of contact between the adjacent elements may approach one-half of the width of a site element but is preferably about one-eighth of the length of a site element or less. It should be understood that the particular area of contact between the adjacent elements is not critical to this invention although it may be advantageous under certain circumstances to have a given area of contact. Moreover it is within the broad aspects of the invention to have the adjacent elements, such as 25 and 32 as shown in FIGURE 4, where these adjacent elements make no physical contact but rather have a gap such as gap 38 separating them. The adjacent elements 25 and 32 are only magnetically linked by the field 40 which bridges the gap. This field could range as high as 100 oersteds. It is also within the scope of the invention to vary the thickness of the magnetic film at the gap or contact area or to alter its composition at the contact area. Such modifications facilitate the control of the nucleate transfer process.

Briefly, the devices shown in FIGURES 1–3 may be manufactured by successive applications of a vacuum deposition or electrodeposition technique in which each of the respective magnetic insulative and conductive layers shown are superimposed in an appropriate order. The magnetic thin film 12 may be deposited permalloy having a thickness ranging from 50 to 10,000 angstroms. The thickness of the layer is governed at the lower limit by the disappearance of ferromagnetic properties while self demagnetizing effects and the appearance of significant eddy current losses at relatively high frequencies govern the upper limit of said thickness. The shape and geometry of the film may be formed by any of the well known masking and etching techniques. The insulative layer of silicon monoxide (SiO) and the conductive layer for the coils are similarly formed by deposition, masking and/or etching techniques. These layers may have a thickness in the range of 50 to 100,000 angstroms. The prior art contains many publications regarding the manufacture and preparation of ferromagnetic materials on substrates and the selection of appropriate material for such films. Such publications are typified by "Preparation of Thin Magnetic Films and their Properties" by M. S. Blois, Jr., Journal of Applied Physics, volume 26, August 1955, pp. 975–980, and "Electrodeposition of Magnetic Materials," by I. Wolf, Journal of Applied Physics, March 1962, pp. 1152–1159, to mention a few.

Figure 5:
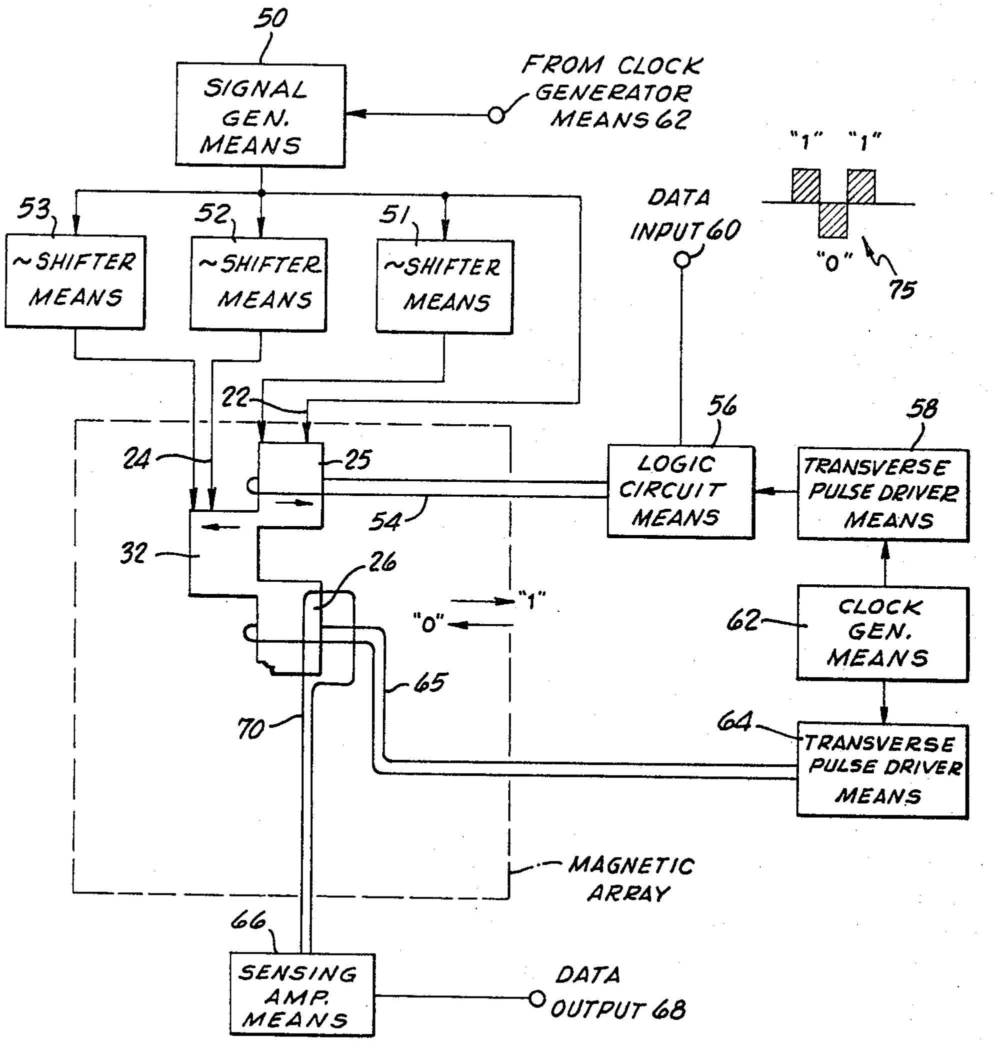
FIGURE 5 is a schematic logic diagram of a drive system utilized with the invented thin film memory.

The operation of the thin film memory of FIGURES 1–3 can best be understood by reference to FIGURE 5 where it is shown in conjunction with logic circuitry for controlling the energization of the coils or field energizing means 22 and 24.

The logic circuitry or energizing means for the thin film device shown in FIGURE 5 includes a signal generator means 50 which generates a sinusoidal waveform. The output of the signal generator means 50 is connected to coil 24 via phase shifter means 52 and 53. The output of means 50 is connected to coil 22 via phase shifter means 51, and also is connected directly to coil 22. A current in coil 22 causes a field to be applied to coil site 25 while a current in coil 24 causes a field to be applied to site 32. The phase shift means 52 shifts the sinusoidal input waveform by approximately 180°. This means when coil 22 is energized with a positive half cycle of the sinusoidal waveform then the coil 24 will be energized with a negative half cycle and vice versa.

The site 25 has a transverse driver coil 54 coupled to it and connected to a logic circuit means 56 which in turn is connected to a transverse pulse driver means 58. Logic circuit means 56 enables the coil 54 to be energized in accordance with the data input supplied to an input terminal or means 60. The transverse pulse driver means 58 provides a properly shaped pulse to drive the coil 54 and create a field substantially perpendicular to the field created by coil 22. It should be realized that the arrangement of logic circuit means 56 and transverse driver means 58 may be reversed.

Transverse driver means 58 is synchronized by a clock generator means 62 which is also connected to a second transverse pulse driver means 64. Clock generator means 62 may be any of those well known clock generators that are common in the computer art. Second transverse pulse driver means 64 is connected to the final bit in the thin film checkerboard array and cooperates with a sense amplifier means 66, signal generator 50 and coil 22 to provide a readout at a readout terminal 68. Transverse pulse driver means 64 supplies a pulse each time signal generator means 50 supplies a positive half cycle of the sinusoidal waveform. Sense amplifier means 66 has a coil loop 70 connected to it which is also coupled to the site 26. Coil 70 senses or transduces the magnetic changes that occur in the site when it has a field applied to it by transverse pulse driver means 64 and coil 65 along with the field applied by signal generator means 50 and coil 22.

Figures 6, 7:
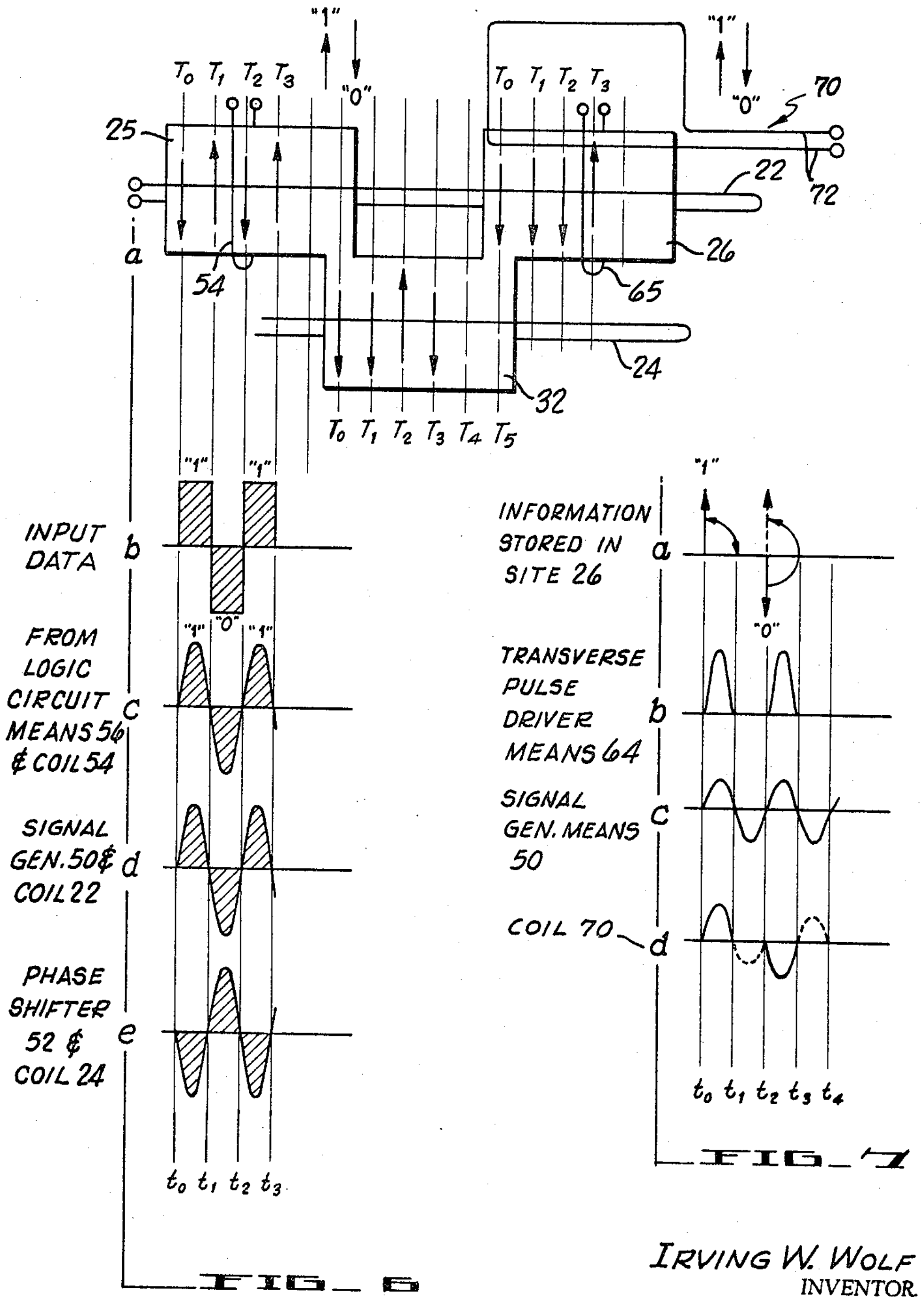
FIGURE 6 is a schematic diagram of an operational sequence of the invented magnetic array and the waveform utilized.
FIGURE 7 is a waveform and timing diagram for the readout operation.

Considering FIGURE 5 and the timing diagram of FIGURE 6 together, in operation the input data indicated at 75 is supplied to input terminal 60. This input data is also shown in FIGURE 6*b*. As a result of this input data the logic circuit means will enable transverse pulse driver means 58 to transmit signals of the form and arrangement shown in FIGURE 6*c*. The input data requires that a "one" be stored in sites 25 and 26 and a "zero" in site 32. A "one" is stored in site 26 by first storing a "one" in site 25 and then stepping the "one" through site 32 and to site 26. This storage and stepping is accomplished by first applying a positive half cycle of the sinusoidal waveform generated by signal generator means 50 to the coil 22 and simultaneously applying a positive pulse to coil 54 via transverse pulse driver means 58 and logic circuit means 56 (see FIGURES 6*c* and *d*). The combination of the fields created by coil 54 and coil 22 are adequate to create a magnetic domain in the direction indicated at $T_1$ in FIGURE 6*a*.

The positive half cycle applied by the coil 22 does not affect site 26 as the magnitude of the field created by coil 22 is not sufficient to reverse the magnetization of site 26. Reversal requires that adjacent site 32 form a reverse nucleate (minute reversely directed domains) coincidental with the application of a positive half cycle by coil 22. This is not the case as adjacent site 32 during the period $T_0$–$T_1$ has the same magnetization as site 26 and no reverse nucleate is formed in site 26. Similarly the site 32 remains unaffected during the period $T_0$–$T_1$ as the negative half cycle applied to coil 24 by signal generator 50 and shifter means 52 creates a field that reinforces the existing state of magnetization of site 32.

During the period $T_1$–$T_2$ signal generator means 50 generates a negative half cycle (FIGURE 6*b*, $T_1$–$T_2$). The field created by the negative half cycle along with the field applied by the coil 54 which is energized by a negative pulse from transverse driver means 58 and logic circuit means 56 (FIGURE 6*c*, $T_1$–$T_2$) results in the switching of the magnetization of site 25 to the orientation shown in FIGURE 6*a* at $T_2$ or a "zero" value.

At the time $T_1$ site 32 had a reverse nucleate in the "one" direction formed therein by the adjacent site 25 which at that time had a "one" direction magnetization. Simultaneously with the existence of this reverse nucleate, a positive half cycle is applied to coil 24 by signal generator 50 and phase shifter 52. The reverse nucleate at site 32 and the positive half cycle cooperate to reverse the magnetization of site 32 to a direction shown at time $T_2$ (FIGURE 6*a*).

The site 26 at time $T_1$ has a field applied to it by coil 22 which tends to reinforce its "zero" state of magnetization, that is the field created by a negative half cycle. Thus, site 26 retains its original state of magnetization during the period $T_1$–$T_2$. The three bit magnetic array 25, 26 and 32 at time $T_2$ has a "zero" stored in site 25 and a "one" stored in site 32 and a "zero" stored in site 26.

At time $T_2$ signal generator means 50 is again applying a positive half cycle to the coil 22 which results in a field that tends to create a "one" direction of magnetization in site 26. Simultaneously with the positive half cycle a positive pulse is transmitted by logic circuit means 50 to coil 54 (FIGURE 6*c*, $T_2$–$T_3$). The coincidence of the fields created by the positive half cycle and the positive pulse result in the reversal of the magnetization of site 25 and the storage therein of a "one."

At the beginning of the time $T_2$ site 32 has a reverse nucleate in the "zero" direction created therein by the site 25. With this nucleate existing, the application of a negative half cycle to coil 24 during the period $T_2$–$T_3$ results in the reversal of the magnetization of site 32. The resulting magnetization is representative of a "zero."

Similarly, the site 26 at time $T_2$ had a reverse nucleate created in it by site 32. This nucleate acting in conjunction with the field created by the positive half cycle applied to coil 22 results in the reversal of the magnetization of site 26. The resulting magnetization of site 26 is representative of a "one."

At time $T_3$ the input data is terminated operation and a "one" is stored in site 25, a "zero" is stored in site 32 and a "one" is stored in site 26. This stored data is representative of the input data.

From the above description it can be seen that the invented memory provides an effective means for storing information or data in a thin magnetic film. The storage of information in the invented memory depends upon one site influencing an adjacent site in such a manner that the adjacent site may be magnetized by a relatively low field applied in the same direction as the field existing in the adjacent site. In the absense of these concurring conditions the application of the relatively low field will have no effect on the thin film site. The switching process in most of the bits is by domain wall motion. The storage in the first bit may be accomplished by rotational techniques.

Once the information is properly stored in the memory, as described above, it is only necessary to then read out the stored information. The readout of information can best be understood by reference to FIGURE 5 and the waveform diagrams of FIGURE 7. The last bit or site in an array, such as site 26 in FIGURE 5, has a sense amplifier means 66 coupled to it via a loop-shaped coil 70. The general configuration of coil 70 as shown in FIGURE 5 minimizes noise effects and interference while enabling the switching fields associated with site 26 to be sensed. The two lead wires 72 are separated by about a two mill gap or space. This avoids any adverse coupling effects.

Sensing amplifier means 66 detects or senses the change in the field of last site 26. Changes in the field of site 26 are caused by the application of a waveform by signal generator means 50 to coil 22 and the coincidental application of a pulse by transverse pulse driver means 64 to coil 65.

Referring to FIGURE 7 the site 26 is first considered to be in a "one" state (FIGURE 7*a*). The application of a positive half cycle by signal generator means 50 (FIGURE 7*c*, $t_0$–$t_1$) and the application of a positive pulse by transverse pulse driver 64 (FIGURE 7*b*, $t_0$–$t_1$) results in the rotational switching of the magnetization to a non-preferred axis. The continued application of the positive half cycle during the interval $t_0$–$t_1$ as compared with the spike pulse supplied by pulse driver means 64 results in the site 26 returning to its original state of magnetization. The sense amplifier means 66 is strobed according to well known techniques to sense the changes in the magnetization of site 26 and the return to its original state. This strobing of the sense amplifier results in an output as shown in FIGURE 7*d* during the period $t_0$–$t_1$.

The sensing of a site in a "zero" state of magnetization is quite similar. In such a case transverse pulse driver means 64 and signal generator means 50 generate a positive pulse and a positive half cycle. The positive pulse and the positive half cycle cause the magnetization of the sensed site to be rotated to assume a direction of magnetization opposed to its original "zero" state. This is shown by the dotted arrow in FIGURE 7*a*. This reversal of magnetization is sensed by coil 70 and sense amplifier means 66 according to well known strobing techniques. The sensed signal will resemble the one shown in FIGURE 7*d* during the period $t_2$–$t_3$. It should be recognized that coils 22, 65 and 70 can be arranged in a number of different ways and reversed to accomplish different switching outputs and different sensing sequences. The above description is but one of many techniques for accomplishing the sensing of information stored in magnetic arrays.

From the above description it can be seen that a thin film memory has been provided that utilizes wall motion switching to store information. This thin film memory has a special geometry which enables the control of domain wall motion with a minimum of complexity. In addition the transfer of data from one site to an adjacent site is accomplished by a novel and advantageous reverse nucleate transfer process. While this process does involve what is known as creep switching, this creep switching is concentrated at the area joining the adjacent sites. Creep switching generally refers to the switching that occurs at the interface between two oppositely oriented domains. The switching in this small area may be more easily controlled by location of the energizing coils or other means such as varying material thickness or composition. It should also be noted that free poles are distributed over the film so that they may be substantially minimized or controlled. The outlook is that this thin film memory media may be mass produced with cost reductions of at least a factor of 10 and perhaps a factor of greater than 100. The speed of this unit approaches cycle times of a microsecond without pressing the state of the art.

Figure 8:
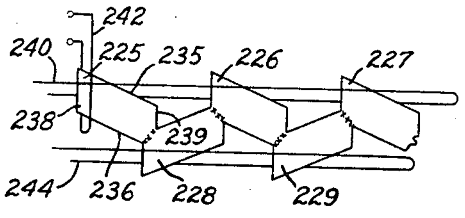
FIGURE 8 is a final embodiment of a thin film magnetic array utilizing the invention.

A final embodiment of the invention is shown in FIGURE 8. This embodiment is similar to the one shown in FIGURES 2 and 3 with the exception that the checkerboard array has sites 225–229 with the sides such as sides 235 and 236 arranged at an angle other than 90° to the sides 238 and 239. The sites 225–229 may be generally described as angular parallelograms. This construction of the sites provides directionality in the movement of the domain walls through the gap area. This directionality is accomplished with two coils 240 and 242 that are arranged in the same manner as shown in FIGURE 2.

The energization of coil 240 to create a "zero" magnetization along with the appropriate energization of coil 242 results in the domain in site 225 moving in a downward right direction through the area connecting site 225 and 228 to nucleate site 228 (assuming an oppositely directed initial magnetization). The energization of coil 240 in an opposite manner results in domain movement in an upward left direction in a properly nucleated site 225 or 226 without these sites effecting or nucleating adjacent sites 228 and 229 respectively. The sites 225–227 will nucleate only those sites in the adjacent lower right position (e.g. site 26 will nucleate site 29).

The energization of coil 244 to create a "zero" direction magnetization or domain in site 228 (with a nucleate in the same direction present therein) results in domain wall movement downward left without a nucleate transfer to site 25. With a nucleate and applied magnetization in the opposite direction the domain wall movement is an upward right direction with a nucleate transfer to site 226 and no transfer to site 225.

In the above manner unidirectionality is obtained. It may also be obtained by other means such as varying the composition or thickness of the magnetic film across each site. These alternatives provide a means for obtaining asymmetry of magnetic properties in each bit.

In summary the invented thin film magnetic array provides a means for the storage of information or data by domain wall motion which may be precisely controlled. It is the unique geometry of the checkerboard arrangement that enables this control with a minimum of complexity. The entire array may be manufactured by mass production vacuum deposition techniques at a substantial reduction in cost as compared with commonly used magnetic core arrangements. With the invented memory bit capacities of $10^8$, readout serially from 180 kilocycles to 2–3 megacycles, random access to 8 bits in a microsecond and initial cost of $100 or less are possible.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. It is the intention, therefore, to be limited only as indicated by the scope of the following claims.

What is claimed is:

1. In a thin film magnetic memory, the combination comprising:
substrate means for supporting a thin film;
a plurality of magnetic thin film elements deposited on said substrate means in alternately staggered zig-zag configuration along a common plane, with adjacent sites overlapping a selected distance to provide magnetic coupling therebetween;
energization means coupled to said thin film for magnetizing said thin film elements in a predetermined manner.

2. The structure defined in claim 1 wherein
each of said magnetic thin film elements have a first preferred direction of magnetization and a second preferred direction of magnetization, wherein the overlap of adjacent elements causes the magnetization of a first one of said elements in one of said preferred directions to enable an oppositely magnetized adjacent element to be magnetically switched in the same direction as said first element by the application of a given magnetic field in the same direction as said first element;
wherein said energization means includes magnetic field means for applying a given magnetic field to said elements in said first preferred direction and said second preferred direction, said field created by said magnetic field means being sufficient to cause domain wall motion in the thin film element having an oppositely magnetized film element adjacent thereto in said overlapping relation.

3. The structure recited in claim 2 wherein said sites have the form of angular parallelograms to provide selected unidirectional movement of the domain walls along the sites.

4. The structure defined in claim 2 wherein said thin film elements are substantially rectangular in shape with adjacent elements alternately staggered to define at least two different levels within the common plane.

5. The structure defined in claim 4 wherein said adjacent alternately staggered elements have edges which overlap said selected distance without physical contact therebetween.

6. The structure defined in claim 4 wherein said adjacent alternately staggered elements have edges which overlap said selected distance with physical contact therebetween.

7. The structure defined in claim 6 wherein said overlapping edge is made from a different composition than said adjacent elements.

8. The structure defined in claim 7 wherein the thin magnetic films have insulating films deposited thereon and said magnetic field means includes conductors deposited on said insulator films.

9. The structure of claim 2 wherein
said magnetic field means includes coil means for independently applying a magnetic field to each level of sites within the common plane;
the structure further comprising signal generator means for energizing said coil means with a predetermined electrical waveform, said signal generator means having an output which is directly coupled to said coil means associated with one level of sites;
phase shifter means for shifting the electrical waveform of said signal generator a predetermined number of electrical degrees, said phase shifter means coupled to said coil means associated with another level of sites and coupled to the output of said signal generator means.

10. The structure recited in claim 9 further including second coil means coupled to said first site of said array for applying a magnetic field thereto, and driver means coupled to said second coil means for selectively energizing said coil means.

References Cited

UNITED STATES PATENTS

| | | | |
|---|---|---|---|
| 3,176,276 | 3/1965 | Smith | 340—174 |
| 3,257,649 | 6/1966 | Dietrich et al. | 340—174 |
| 3,241,127 | 3/1966 | Snyder | 340—174 |

FOREIGN PATENTS 129,391 9/1959 U.S.S.R.

OTHER REFERENCES (1) IBM Tech. Bulletin, vol. 4, No. 7, December 1961, pp. 74, 75.

STANLEY M. URYNOWICZ, Jr., *Primary Examiner.*

B. L. HALEY, *Assistant Examiner.*